Figure 1:
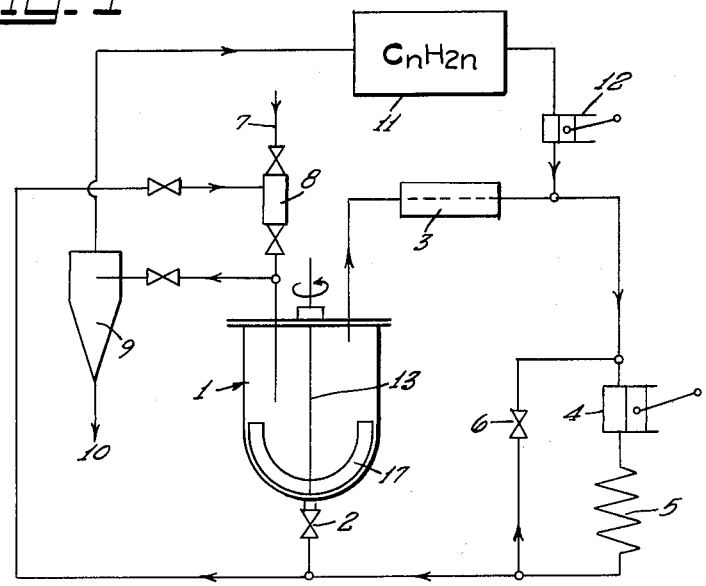

INVENTORS:
KARL WISSEROTH
HANS GEORG TRIESCHMANN
HEINRICH WEBER

United States Patent Office 3,256,263
Patented June 14, 1966

3,256,263
METHOD FOR CARRYING OUT POLYMERIZATION PROCESSES
Karl Wisseroth, Hans Georg Trieschmann, and Heinrich Weber, Ludwigshafen (Rhine), Germany, assignors to Badische Anilin- & Soda-Fabrik Aktiengesellschaft, Ludwigshafen (Rhine), Germany
Filed Feb. 4, 1960, Ser. No. 6,811
Claims priority, application Germany, Feb. 5, 1959, B 51,990
2 Claims. (Cl. 260—94.9)

This invention relates to improvements in the polymerization of monomers. More specifically, the invention relates to an improved method of continuously withdrawing the heat evolved in the polymerization of gaseous substances and simultaneously maintaining an intensive movement of the virgin powdered product in the reactor by expanding and cyclically introducing into the reactor a relatively small amount of gaseous monomer.

In the copending application Ser. No. 638,635 filed February 6, 1957, by Karl Wisseroth, Walter Pietsch and Ernst-Guenther Kastning, now abandoned, there is described a process for withdrawing reaction heat evolved in continuous polymerization processes in which one or more reactants are led in circulation as heat carriers, polymerizable and/or non-polymerizable gaseous components being compressed in one section of the circulation and expanded through a throttle valve to a substantially lower pressure directly into the reactor according to the compression-refrigerator principle, the temperature thereby being lowered. In order to lower the temperature sufficiently, the pressure is usually reduced by at least 90–100 atmospheres. In the reactor, the said gaseous components spontaneously absorb the polymerization heat during or immediately after the expansion and lead it away through a heat exchanger interposed in the circulation. In some cases gaseous reaction components are thereby partly liquefied.

Reliable control of the temperature in the reactor is achieved according to this process not only in the presenc of inert diluents or solvents, for example hydrocarbons which are liquid under standard conditions but the withdrawal of large amounts of heat per unit of time may be achieved in an especially simple way also in gas phase polymerization, for example of olefines, without the addition of inert liquids. In this case the reaction system consists of the gaseous olefine to be polymerized, for example ethylene, and a catalyst which is generally solid and finely grained. Catalysts suitable for this purpose are above all carrier-supported oxides of chromium, molybdenum, tungsten and uranium, or mixtures formed by reacting organic compounds of metals of groups IA, IIA and IIIA of the periodic system or also hydrides of these metals on the one hand with compounds of metals of groups IVB, VB and VIB on the other hand. Organic peroxides and azo compounds, as for example azodi-isobutyronitrile, may however also be used as catalysts.

In reaction systems of the said kind the polymer is obtained in a pulverulent to finely granular state. As the gaseous reactants are being introduced, the polymer increasingly fills up the lower part of the reactor together with the very finely granular catalyst. With the pulverulent mixture of substances filling up the reactor to an ever increasing extent, the original reaction conditions are unfavorably affected. As a result, the polymerization reaction is retarded, proceeds at locally varying speed and may die down completely, unless care is taken to ensure that the pulverulent to finely granular mixture of substances is intensely agitated.

It has therefore been proposed to carry out the gas phase polymerization of olefines in a fluidized layer in which favorable reaction conditions are present. In order to maintain the vigorous whirling and rolling movement of such a layer, relatively large amounts of gaseous olefines, beyond the amounts necessary for the polymerization, have to be passed through the reactor. Experiments have shown that in the polymerization of ethylene, for example about 100 to 150 times the amount of gas must be passed through the reactor per unit of time with reference to the amount to be polymerized in the same unit of time. The catalysts used are in general extremely sensitive to impurities even when these are introduced only in very small amounts. The circulation of large excessive amounts of the olefine to be polymerized may therefore readily lead to impairment of the catalytic activity because the probability of impurities being introduced increases according to the absolute amount of the substance passed through the reaction space.

The excess amounts of gas necessary for satisfactorily withdrawing the reaction heat evolved in gas-phase polymerization processes are relatively small in comparison with the amounts of gas necessary to maintain a fluidized layer if advantage is taken of the above-described compression-refrigerator principle, according to which the gaseous reactants are expanded directly into the reactor by way of a throttle valve. In the polymerization of ethylene, for example, an excess of only about 11 times of ethylene has to be circulated in order to maintain the reaction temperature constant within narrow limits. Such small amounts of ethylene, however, are not sufficient to maintain a fluidized layer in which the above-mentioned advantageous heat exchange and reaction conditions are present.

We have now found that in polymerization in the gas phase in which the reactants and/or components are led in circulation and expanded through a throttle valve into the polymerization vessels with lowering of temperature it is possible to set up favorable exchange and reaction conditions, similar to those in a fluidized layer, with relatively small excess amounts of gas, by agitating the layer of polymer arising in pulverulent form by mechanical means and leading the monomer, immediately after its expansion, into the reaction in the form of moving gas or liquid jets.

Apparatus for carrying out this process incorporate rotating stirring means in the lower part of the reactor which receives the monomer, and also nozzle heads rotating at about the same height from which the monomer emerges in gaseous or liquefied form, the said two rotating parts being integral or secured to a common shaft. By the continuous movement of the polymer and catalyst particles on the one hand and by the high impulse of the rotating jets of monomer on the other hand, an intimate mixing is ensured in the reactor.

Figure 2:
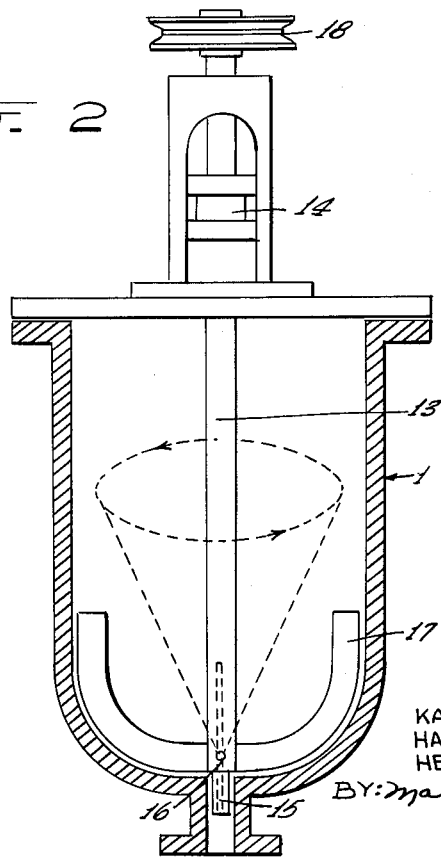

The invention will now be further described with reference to the accompanying diagrammatic drawings in which FIGURE 1 illustrates the layout of the plant and FIGURE 2 is an elevation, partly in section, of the reactor.

As already stated, FIGURE 1 shows schematically a plant for carrying out the process of this invention. A current of monomer, immediately after pressure release through a throttle valve 2, is supplied to the bottom of a reactor 1 capable of being heated or cooled externally. The current of monomer which has been cooled down suddenly by the expansion and possibly partly liquefied thereby, absorbs the polymerization heat set free at the location of the reaction and is thereby reheated or vaporized. After passing through the mechanically stirred layer of polymer in rotational movement, the excess of monomer escapes at the top of the reactor 1. It then passes through a filter 3 which protects the compressor 4 from becoming dusty by entrained polymer particles, is compressed again by compressor 4 and after being cooled in heat exchanger 5 again passes to the throttle valve 2 in front of the reactor 1. By means of a bypass pipe, which bypasses the compressor 4 and the heat exchanger 5, and in which a valve 6 is arranged, the amount of monomer required in circulation can be varied to suit the reaction conditions and the course of the reaction. The catalyst to be introduced into the reactor is supplied at 7 to a sluice 8 and blown into the reactor by means of a partial current branched off from the monomer circulation. The catalyst may be supplied either continuously or at constant intervals or at intervals dependent on the course of the reaction. The polymer is discharged at 10 after having passed through a cyclone 9. The monomer escaping from the cyclone 9 is returned for reuse, for example supplied to a monomer reservoir 11. The amount of monomer used up in the reactor by polymerization and the amount of monomer lost by the discharge of the polymer through the cyclone are continuously replenished by means of a pump 12.

The following example will further illustrate this invention but the invention is not restricted to this example.

*Example*

About 5 kilograms of ethylene are polymerized per hour at an ethylene pressure of 35 atmospheres and a reaction temperature of 90° C. In order to maintain the reaction temperature, it is necessary to withdraw per hour from the reactor a heat quantity of about 3750 kg.-cal. For this purpose an additional 34.7 kilograms of ethylene are circulated with temporary compression from 35 atmospheres to 150 atmospheres. The heat exchanger is cooled with water at room temperature. The reaction temperature can be maintained without trouble with only trivial fluctuations of a few degrees. In particular it is possible by working in this way so to control the reaction temperature that nowhere in the reactor charge is the sintering temperature of the pulverulent to fine-grained ethylene polymer (about 125° C.) reached. Any sintering or fusing together of the polymer particles would considerably disturb or even render impossible the continuous discharge from the reactor by pneumatic conveyance.

The reactor 1 shown in FIGURE 2 is provided with an anchor-shaped mechanical stirrer mounted on a vertical shaft 13. The shaft 13 passes through a bearing 14 arranged in the cover of the reactor and is driven from its free upper end by a pulley 18. The lower reduced end of the shaft 13 is carried in a step bearing. The journal 15 of the shaft 13 is drilled hollow and serves in association with an externally flanged extension of the bore of the step bearing as the supply pipe for the monomer. For this purpose, two radial, preferably jet-shaped outlet openings 16 are provided in the lower hollow section of the shaft 13, the said openings being spaced apart by 180°. The jets of monomer issuing through the openings 16 are approximately perpendicular to the anchor-shaped stirrer 17. The axes of the openings 16 may include with the axis of the shaft 13 a more or less acute angle so that the jets of monomer are directed obliquely upward. Instead of only two openings 16 it is also possible to provide a plurality of radially directed openings or bores in the lower hollow section of the shaft 13, said openings being arranged one above another. By reason of the rotation of the openings 16, the impulses of the jets of monomer are exerted in a different direction in the lower part of the reactor at any moment. The stirrer blades 17 secured to the shaft 13 should reach as near as possible to the edge of the layer to be kept in movement, i.e. there should be provided only a small clearance between the edge of each stirrer arm and the wall of the reactor. The stirrer blades 17 are also preferably given an angle of about 45° with respect to the shaft and/or the reactor wall in order to ensure a frequent turning over and an intimate mixing of the pulverulent polymer layer and a constant mixing of the catalyst.

What we claim is:

1. A continuous process for polymerizing a monomeric gaseous reactant in the presence of a solid and finely grained catalyst whereby a polymer is formed in a pulverulent to finely granular state which comprises: introducing an excess of said gaseous reactant into a reaction zone with a throttled expansion from a pressure substantially higher than the pressure within said reaction zone such that the solid polymer is maintained in a fluidized state and the compression-refrigerator cooling principle is employed to cool said throttled gaseous reaction sufficiently to neutralize the excess exothermic heat of polymerization, withdrawing the excess unpolymerized gaseous reactant from the reaction zone, recompressing said excess unpolymerized gaseous reactant to a pressure substantially higher than the pressure within the reaction zone, cooling and recycling said excess unpolymerized gaseous reactant and re-expanding said gaseous reactant through a throttle valve into said reaction zone, said monomeric gaseous reactant being expanded into the lower region of the reaction zone through openings in a hollow shaft extending axially through said reaction zone, said shaft being rotated so as to produce rotating jets of said monomeric gaseous reactant, and mechanically agitating the mixture of pulverulent polymer produced in said reaction zone and said granular catalyst whereby an intimate mixing is produced in the reactor of said gaseous monomeric reactant and said granular catalyst.

2. A process as in claim 1 wherein said rotating jets are directed obliquely upward.

References Cited by the Examiner

UNITED STATES PATENTS

| 1,402,318 | 1/1922 | Rodebush | 23—285 |
| 2,484,384 | 10/1949 | Levine et al. | 260—683.15 |
| 2,882,264 | 4/1959 | Barnes et al. | 260—94.9 |
| 2,885,389 | 5/1959 | Schappert | 260—94.9 |
| 2,886,561 | 5/1959 | Reynolds et al. | 260—94.9 |
| 2,917,372 | 12/1959 | Wallin | 23—285 |
| 2,990,399 | 6/1961 | Peterlein | 260—93.7 |

FOREIGN PATENTS 567,238   10/1957   Italy.

JOSEPH L. SCHOFER, *Primary Examiner.*

MORRIS LIEBMAN, *Examiner.*

S. ASTOR, F. L. DENSON, *Assistant Examiners.*